Patented Jan. 19, 1932

1,841,672

UNITED STATES PATENT OFFICE

WILLIAM E. PETERSEN, OF ST. PAUL, MINNESOTA

REAGENT FOR VOLUMETRIC DETERMINATION OF FAT

No Drawing.   Application filed November 29, 1929.   Serial No. 410,653.

My invention relates to the art or means for the volumetric determination of the fat content of various fat-containing compounds such as milk, cream, ice cream, animal tissues and the like. Hitherto the fat-containing contents of such materials has been generally determined by what is known as the Babcock test which makes use of sulphuric acid as the active reagent. The use of sulphuric acid is objectionable not only because of the element of danger in handling this strong acidite, but because it does not usually give a clean-cut line of demarkation between the separated fat and the residue, and also includes in the fat such compounds as phospholipoids which contaminate the fat to some extent.

My invention provides a new composition of matter which is alkaline and is comparatively harmless to hands and clothing and which, when mixed with fat-containing compounds, causes a complete separation of the fat from the residue and affords a fat-content test that is very much more accurate than that accomplished by the use of sulphuric acid.

The improved fat-determining compound consists of the mixture of salts of aromatic acids, a carbonate, a hydroxide and two alcohols, preferably diluted with water before use. Various different salts of aromatic acid, various different carbonates, various different hydroxides and certain different alcohols may be used.

For example, I have successfully used as a salt of aromatic acid, sodium salicylate, sodium benzoate, potassium salicylate, potassium benzoate; as a carbonate, I have used potassium carbonate and sodium carbonate; as a hydroxide I have used sodium and potassium hydroxide; and as the two alcohols, I have used butyl-alcohol or butanol and methyl alcohol or methanol. I have found that two alcohols having different actions are required and while exactly the actions that these two alcohols perform cannot be definitely stated, it appears that the one alcohol must act to decrease the inter-facial tension and the other to increase the solubility of the alcohol first referred to. In the use of butyl alcohol and methyl alcohol, it is the first noted that decreases the inter-facial tension and the second that increases the solubility of the first.

Having now discussed the general features involved, I will give several specific illustrations of the reagent and the manner of its use.

Example No. 1

400 grams of sodium salicylate and 210 grams of sodium carbonate is made up to one litre with water. To this is added 40 cubic centimeters of a fifty per cent solution of sodium hydroxide, the 80 cubic centimeters each of butyl alcohol and methyl alcohol.

Example No. 2

400 grams of potassium benzoate and 200 grams of postassium carbonate and made up to one litre with water. Add 40 cubic centimeters of fifty per cent solution of sodium hydroxide and 80 cubic centimeters each of butyl and methyl alcohol.

Then if the Babcock apparatus is to be used, a portion of either of these compounded reagents is mixed with an equal portion of milk, cream or other fat-containing material. To hasten the separation of the fat from the residue, the two commingled materials should then be heated to a temperature of say 120 degrees although this temperature may be very greatly increased. It may be centrifuged according to the Babcock method or permitted to stand, and the fat rising from the residue leaves a clean and well defined line of demarkation between the two.

The fat separated by the above means will be free from phospholipoids and substantially pure. For the purposes of these tests, I have found that butanol is the chemical equivalent of butyl alcohol and that methanol is the chemical equivalent of methyl alcohol. The interaction of the reagent described keeps down the alkalinity of the solution and prevents saponification of the fats. The phospholipoids are retained in the residue.

The carbonate in the compound herein disclosed and claimed is a highly important element. Sodium carbonate in the mixture acts as a buffer, permitting a smaller amount of caustic alkali to get the most speedy reaction with the least danger of saponification of fat. The compound has been extensively used in determining the amount of fat content in cream, milk, buttermilk, and ice cream, but it has also been found useful and efficient in determining the amount of fats contained in other substances such as meats and plant tissue.

What I claim is:

1. A reagent for volumetric determination of fat in fat-containing compounds consisting of a mixture of salts of aromatic acid, a carbonate, a hydroxide and two alcohols.

2. A reagent for volumetric determination of fat in fat-containing compounds consisting of a mixture of salts of aromatic acid, a carbonate, a hydroxide and two alcohols, the first of which alcohols has the property of decreasing the inter-facial tension and the second of which has the property of increasing the solubility of the first.

3. A reagent for volumetric determination of fat in fat-containing compounds consisting of a mixture of salts of aromatic acid, a carbonate, a hydroxide and two alcohols, the first of which alcohols has the property of decreasing the inter-facial tension and the second of which has the property of increasing the solubility of the first, the said substances being diluted in water.

4. A dry compound for mixture with alcohol to form a reagent for volumetric determination of fats, consisting of a salt of aromatic acid, a carbonate and a hydroxide.

5. The compound described in claim 1 in which one of the alcohols is a butyl alcohol or butanol and the other is methyl alcohol or methanol.

In testimony whereof I affix my signature.

WILLIAM E. PETERSEN.